United States Patent
Badolato Martin et al.

(10) Patent No.: US 11,565,733 B2
(45) Date of Patent: Jan. 31, 2023

(54) SPEED CONTROL AND TRACK CHANGE DETECTION DEVICE SUITABLE FOR RAILWAYS

(71) Applicant: AUTO DRIVE SOLUTIONS, S.L., Madrid (ES)

(72) Inventors: Alejandro Badolato Martin, Madrid (ES); Jesús Antonio Del Castillo Igareda, Madrid (ES)

(73) Assignee: AUTO DRIVE SOLUTIONS, S.L., Madrid (ES)

( * ) Notice: Subject to any disclaimer, the term of this patent is extended or adjusted under 35 U.S.C. 154(b) by 755 days.

(21) Appl. No.: 16/482,311

(22) PCT Filed: Feb. 22, 2018

(86) PCT No.: PCT/ES2018/070132
§ 371 (c)(1),
(2) Date: Jul. 31, 2019

(87) PCT Pub. No.: WO2018/154167
PCT Pub. Date: Aug. 30, 2018

(65) Prior Publication Data
US 2020/0001905 A1    Jan. 2, 2020

(30) Foreign Application Priority Data

Feb. 23, 2017 (ES) ............... ES201730236

(51) Int. Cl.
*B61L 25/02* (2006.01)
*B61L 25/06* (2006.01)
(Continued)

(52) U.S. Cl.
CPC ............. *B61L 25/021* (2013.01); *B61L 23/04* (2013.01); *B61L 25/02* (2013.01); *B61L 25/06* (2013.01);
(Continued)

(58) Field of Classification Search
CPC ........ B61L 25/02; B61L 25/021; B61L 25/06; B61L 23/04; B61L 27/20; B61L 2201/02; B61L 2205/04; B60L 2200/26
See application file for complete search history.

(56) References Cited

U.S. PATENT DOCUMENTS

| 4,027,840 A | 6/1977 | Blair |
| 6,360,998 B1 | 3/2002 | Halvorson et al. |

(Continued)

FOREIGN PATENT DOCUMENTS

| WO | WO 2004074823 A2 | 2/2004 |
| WO | WO 2016022635 A1 | 2/2016 |

(Continued)

*Primary Examiner* — Zachary L Kuhfuss
(74) *Attorney, Agent, or Firm* — Aslan Law, P.C.

(57) ABSTRACT

A speed control and track change detection device for railways is characterised in that it comprises three high-frequency radar sensors located at the vertices of an imaginary triangle and a digital processing device for processing the signals detected by the radars, wherein in the case of the speed control system, both sensors are located at 1 m distance from each other along the axis of the path of the railway and inspect the ground of the infrastructure 2 cm away from the outside of each rail, and according to the temporal offset of the signals obtained the digital processing device estimates the exact speed of the train.

5 Claims, 2 Drawing Sheets

(51) Int. Cl.
*B61L 23/04* (2006.01)
*B61L 27/20* (2022.01)

(52) U.S. Cl.
CPC .......... *B60L 2200/26* (2013.01); *B61L 27/20* (2022.01); *B61L 2201/02* (2013.01); *B61L 2205/04* (2013.01)

(56) References Cited

U.S. PATENT DOCUMENTS

| | | | | |
|---|---|---|---|---|
| 7,948,613 | B2* | 5/2011 | Fourcault | B60T 8/172 |
| | | | | 356/28 |
| 9,849,895 | B2* | 12/2017 | Mesher | B61L 23/04 |
| 10,349,491 | B2* | 7/2019 | Mesher | B61L 23/045 |
| 2015/0175178 | A1* | 6/2015 | Ignatius | B61L 23/041 |
| | | | | 246/120 |
| 2016/0046308 | A1* | 2/2016 | Chung | B61L 27/70 |
| | | | | 701/20 |
| 2017/0057528 | A1* | 3/2017 | Green | B61L 25/025 |
| 2017/0313332 | A1* | 11/2017 | Paget | B61L 25/021 |

FOREIGN PATENT DOCUMENTS

| | | |
|---|---|---|
| WO | WO 2016180992 A1 | 11/2016 |
| WO | WO 2017149357 A1 | 9/2017 |
| WO | WO 2018096388 A1 | 5/2018 |
| WO | WO 2018115930 A1 | 6/2018 |

* cited by examiner

SPEED CONTROL AND TRACK CHANGE DETECTION DEVICE SUITABLE FOR RAILWAYS

CROSS-REFERENCE TO RELATED APPLICATIONS

This application claims priority to ES Patent Application No. P201730236 (ES 201730236) filed on Feb. 23, 2017, and to PCT Application No. PCT/ES2018/070132 filed on Feb. 22, 2018, the entire contents of which are hereby incorporated by reference.

OBJECT OF THE INVENTION

The invention envisaged relates to a speed control and track change detection system.

The inspection of the ground of the infrastructure allows 2 different problems to be solved. The first of them is measuring the speed of the train in unfavourable conditions, such as snowy environments wherein the Doppler radar that is normally used to estimate speed does not function properly, given that the dihedron formed by the railway sleeper and track ballast that serves to reflect the radar signal becomes hidden by the snow. The second solves the identification of the track selected when the point blades are changed without the help of railway signalling equipment.

Each one of the problems is solved with a pair of radar sensors. In the first case, the radar sensors are installed on the longitudinal axis of the train with a known distance between them, and in the second case the two radar modules are on a transverse axis.

FIELD OF THE INVENTION

The field of the invention is the auxiliary railway industry and the supporting electronics industry.

BACKGROUND OF THE INVENTION

There is some prior art relating to devices that carry out a function of reading information of means by similar means.

Among said devices, the inventor is likewise the inventor of international patent PCT/ES2015/070378, which describes as a coding means a guide-rail installed flush with the road surface but which can optionally be concealed under an asphalt layer treated with a layer of hydrophobic material with preferred dimensions of 1.5 cm wide by 5 cm deep, and wherein on the inside thereof cavities are machined, the cavities preferably being dihedral given that dihedral planes increase the reflected signal, thereby facilitating the detection thereof.

Likewise, the same inventor has registered international patent PCT/IB2016/051159, which details other information means with the same purpose. These information-coding and reading systems have more applications wherein it is not necessary for the sensor to be installed on a mobile and the information that is coded does not have the single function of determining the relative position of the sensor with respect to the coded means.

Moreover, the inventor has also filed a similar system to the one proposed, using radar techniques according to PCT/IB2016/057119 or an optical system according to PCT/IB2016/057873.

But the case of using 2 radar sensors to measure the speed of a train or to determine the track selected in a change of the point blades is not contemplated.

The inventor does not know of any prior art that incorporates the arrangements presented by the current invention, or of the advantages said arrangement provides.

DESCRIPTION OF THE INVENTION

Figure 1:
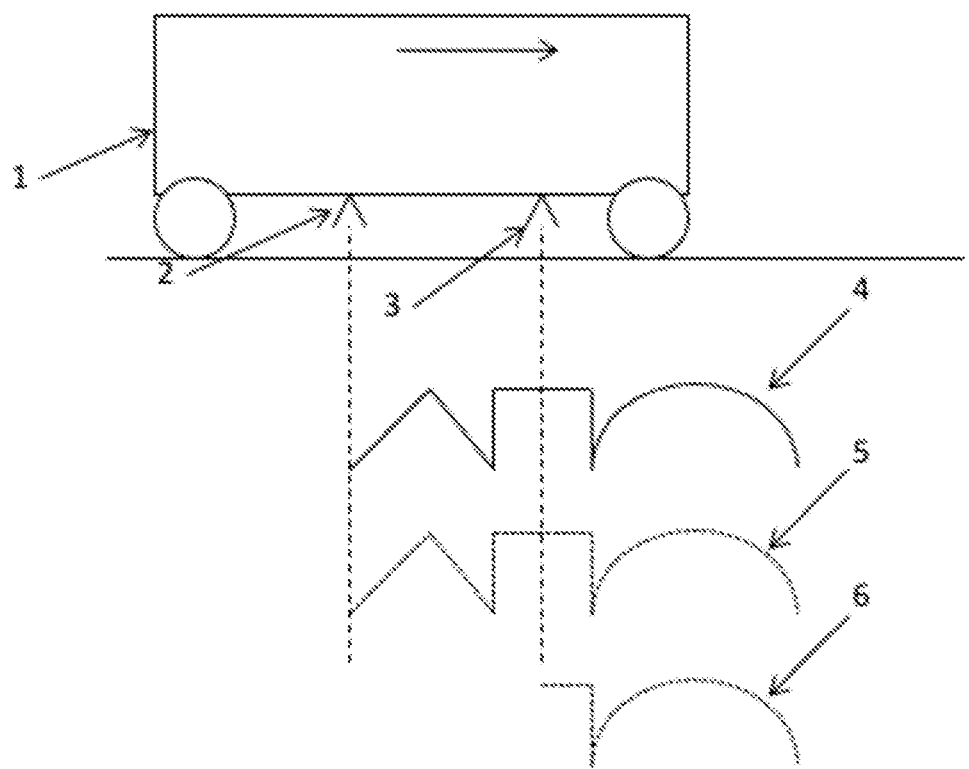
FIG. 1 illustrates an example of a speed control and track change detection system for railways illustrating at least a train (1), a first radar sensor (2), a second radar sensor (3), a ground profile (4), a radar profile of the first ground sensor (5) and a radar profile of the second ground sensor (6).
Figure 2:
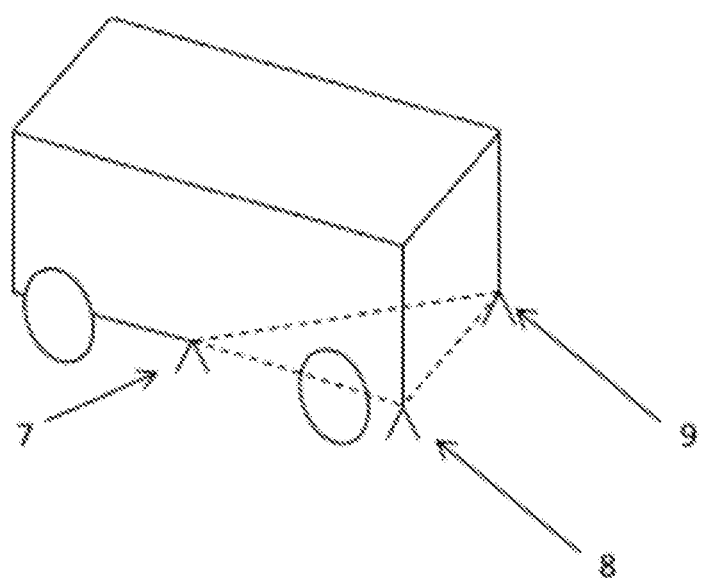
FIG. 2 illustrates an example of a speed control and track change detection system for railways illustrating at least three high-frequency radar sensors (7, 8, and 9).

If both sensors are arranged on a longitudinal axis and separated from one another by a known distance it is possible to determine the speed of a train. Each one of the sensors concentrates its energy on a square centimetre of the surface and precisely measures the distance from the sensor to the ground. This way, each one of the 2 sensors obtains a detailed profile of the ground as the train advances. The processing of the two signals obtained allows the time lag existing between both profiles to be detected, thereby obtaining an estimation of the speed. This system functions in snowy environments since the surface is not entirely uniform.

If both sensors are arranged on an axis perpendicular to the path and inspect the outside of each rail, each sensor is able to detect the presence of the rail when the same crosses it, identifying if the train has changed track.

There is also the possibility of installing sensors on the inside of the rails and detecting which of them has been passed over first and thus detect if the train has changed track.

In both cases, instead of using electromagnetic waves, it is possible to use pressure waves to inspect the infrastructure.

As such, with only three sensors situated in a triangle, two perpendicular to the axis of the path and one on the same axis as any one of the former, it is possible to solve the problem.

PREFERRED EMBODIMENT OF THE INVENTION

The invention envisaged relates to a speed control and track change detection system.

The system is made up of two main elements:
Three high-frequency radar sensors,
A device for digitally processing the radar signals Thus, the preferred embodiment consists of the installation of three high-frequency radar sensors which, placed underneath the train, concentrate the radiated energy on a square centimetre of the surface with the help of a dielectric lens.

The three sensors are situated at the vertices of an imaginary triangle.

In the case of the speed control system, both sensors are located at 1 m of distance from each other along the axis of the path and inspect the ground 2 cm away from the outside of each rail.

The digital processing device for processing the radar signals detects the temporal offset between both signals, thereby obtaining an estimation of the speed, given that the separation between the sensors is known.

The third sensor is arranged on an axis perpendicular to the path at the height of the first of the former sensors and inspects the outside of each rail, the digital processing device for processing the radar signals being able to detect the presence of the rail when the same crosses it, identifying if the train has changed track.

There is also the possibility of installing sensors on the inside of the rails and detecting which of them has been passed over first and thus detect if the train has changed track.

In both cases, instead of using electromagnetic waves, it is possible to use pressure waves to inspect the infrastructure.

Having sufficiently described the nature of the invention, in addition to the practical embodiment thereof, it is hereby stated that the arrangements indicated above are susceptible to modifications of the details, provided they do not change the fundamental principles thereof established in the foregoing paragraphs and summarised in the following claims.

The invention claimed is:

1. A speed control and track change detection system for railways comprising:
    three high-frequency radar sensors situated at vertices of an imaginary triangle, wherein
    two longitudinally arranged radar sensors of said three high-frequency radar sensors are arranged on a longitudinal axis, separated from one another by a known distance, each one of said two longitudinally arranged radar sensors concentrates radiated energy thereof on an area of approximately one square centimeter of the surface and measures the distance from a sensor to a ground, such that from each one of the two longitudinally arranged radar sensors a detailed profile of the ground is obtained as a train advances;
    a third sensor of said three high-frequency radar sensors is arranged on an axis perpendicular to a path at the height of one of said two longitudinally arranged radar sensors, such that each sensor obtains a detailed profile of the ground on an outside of a rail, so that a digital processing device for processing radar signals is able to detect the presence of the rail when the three high-frequency radar sensors crosses a track, identifying if the train has changed track;
    the digital processing device for processing the radar signals that measures a time lag existing between the profiles of the ground obtained by the two longitudinally arranged radar sensors and calculates the speed of the train and identifies, through the profiles of the ground obtained by the transversely arranged radar sensors, the detection of when the rails are passed over and determines when the train changes track;
    two radar sensors of said three high-frequency radar sensors are separated by said known distance from each other along the longitudinal axis of the tracks and pointing towards the ground obtain a profile of the infrastructure; and
    a digital signal processing is performed with both radar range-profiles to determine a time delay between them and the speed of the train is estimated by dividing a space between said two radar sensors between the time delay.

2. The speed control and track change detection system for railways according to claim 1, wherein
    in the speed control system, said two longitudinally arranged radar sensors, located at 1 m distance from each other along an axis of a path and inspect the ground 2 cm away from the outside of each rail and the digital processing device for processing the radar signals detects a temporal offset between the radar signals, thereby obtaining an estimation of the speed based on the known distance of separation between the two longitudinally arranged radar sensors.

3. The speed control and track change detection system for railways according to claim 1, wherein
    in the track change detection system, said two longitudinally arranged radar sensors are used that are arranged on an axis perpendicular to the path and inspect the outside of each rail, and
    the digital processing device for processing the radar signals detects the presence of the rail when the three high-frequency radar sensors crosses the track.

4. The speed control and track change detection system for railways according to claim 1, wherein
    electromagnetic waves are used to inspect an infrastructure of the railway.

5. The speed control and track change detection system for railways according to claim 1, wherein
    pressure waves are used to inspect an infrastructure of the railway.

* * * * *